(12) United States Patent
Opperman (10) Patent No.: US 9,488,449 B2
(45) Date of Patent: Nov. 8, 2016

(54) OPERATION PLATFORM

(75) Inventor: Avner Opperman, Tel Aviv (IL)

(73) Assignee: AGRITECHNIQUE ENGINEERING LTD., Tel Aviv (IL)

( * ) Notice: Subject to any disclaimer, the term of this patent is extended or adjusted under 35 U.S.C. 154(b) by 259 days.

(21) Appl. No.: 13/639,531

(22) PCT Filed: Apr. 7, 2011

(86) PCT No.: PCT/IL2011/000294
§ 371 (c)(1),
(2), (4) Date: Oct. 5, 2012

(87) PCT Pub. No.: WO2011/128891
PCT Pub. Date: Oct. 20, 2011

(65) Prior Publication Data
US 2013/0030661 A1     Jan. 31, 2013

(51) Int. Cl.
| | |
|---|---|
| *B25J 5/00* | (2006.01) |
| *F41H 7/00* | (2006.01) |
| *B25J 15/04* | (2006.01) |
| *F41H 11/16* | (2011.01) |
| *F41H 11/18* | (2011.01) |

(52) U.S. Cl.
CPC .............. *F41H 7/005* (2013.01); *B25J 5/005* (2013.01); *B25J 15/04* (2013.01); *F41H 11/16* (2013.01); *F41H 11/18* (2013.01)

(58) Field of Classification Search
CPC .......... B23B 29/24; B66C 3/00; B25J 13/00; B25J 5/005; F41H 7/005
USPC ................ 701/50, 245; 483/1, 7, 9; 901/41; 318/568.12
See application file for complete search history.

(56) References Cited

U.S. PATENT DOCUMENTS

| | | | |
|---|---|---|---|
| 4,590,662 A | 5/1986 | Norota | |
| 5,017,084 A * | 5/1991 | Lemelson ................ | G07D 7/12 29/26 A |
| 5,302,166 A * | 4/1994 | Marantette ......... | B23Q 3/15526 294/183 |
| 5,341,551 A * | 8/1994 | Brown .................... | B23B 29/20 29/27 C |
| 5,672,044 A | 9/1997 | Lemelson | |
| 7,354,010 B2 | 4/2008 | Ramun et al. | |
| 7,367,451 B2 * | 5/2008 | Pendergraph .......... | B25H 3/003 206/379 |
| 2004/0069668 A1* | 4/2004 | Finnigan ................ | B25H 3/003 206/372 |
| 2009/0302575 A1 | 12/2009 | Archer et al. | |
| 2010/0068024 A1 | 3/2010 | Agens | |
| 2011/0043515 A1* | 2/2011 | Stathis ................. | G01C 15/002 345/419 |

FOREIGN PATENT DOCUMENTS

| | | |
|---|---|---|
| CN | 101288952 A | 10/2008 |
| JP | S6228142 | 2/1987 |
| JP | S6363337 | 12/1988 |

* cited by examiner

*Primary Examiner* — Tuan C. To
*Assistant Examiner* — Isaac Smith
(74) *Attorney, Agent, or Firm* — Dorsey & Whitney LLP (57) ABSTRACT

An operation platform (1), comprising: a platform base (20); a movement mechanism (26) connectable to said platform base and, when so connected, configured for displacement of the platform base; at least one operation tool zone (30) on said platform base configured for accommodating thereat at least one operation tool (50); and at least one boom assembly (10) having a first end fixable to said platform base (20), and a second free end (14), the boom assembly being controllable for displacing said second free end towards at least said one operation tool zone (30), coupling the second free end (14) to at least said one operation tool (50) accommodated within the operation tool zone (30), and maneuvering said second free end (14) with at least said one operation tool coupled thereto.

17 Claims, 10 Drawing Sheets

| 310 | 311 | 312 | 313 | 314 |
|---|---|---|---|---|
| Attachment element ID | Tools type compatibility | Occupied | Tool ID | Location coordinates |
| X1 | Hydraulic Hammer type 126 | YES | T01 | X1, Y1, Z1 |
| X2 | Concrete crasher type 31 | YES | Null | X2, Y2, Z2 |
| X3 | Demotion grapples type15 / Multipurpose grapples type 35 | YES | T02 | X3, Y3, Z3/ X4, Y4, Z4 |

FIG. 9

| 410 | 411 | 412 | 413 | 414 |
|---|---|---|---|---|
| Attachment element ID | Location | Work Hours | Weight | Tools type |
| T01 | X01 | 0 | 270 kg | Hydraulic Hammer type 126 |
| T02 | X03 | 15.5 | 170 kg | Demotion grapples type 15 |
| T18 | B01 | 0 | 200 kg | Concrete crasher type 31 |

FIG. 10

| 510 | 511 | 512 | 513 |
|---|---|---|---|
| Boom Assembly ID | Location coordinates | Max. Carrying Capacity | Occupied |
| B01 | X1, Y1, Z1 | 550 kg | Yes |
| B02 | X2, Y2, Z2 | 1080 kg | No |

OPERATION PLATFORM

CROSS-REFERENCE TO RELATED APPLICATIONS

This application is the National Stage of International Application No. PCT/IL2011/000294, filed Apr. 7, 2011, which claims the benefit of U.S. Provisional Application No. 61/323,614, filed Apr. 13, 2010, the disclosures of which are incorporated herein by reference in their entirety.

FIELD OF THE INVENTION

The presently disclosed subject matter relates to robotic vehicles. Specifically, the presently disclosed subject matter is concerned with operation platforms of unmanned ground vehicles.

BACKGROUND OF THE INVENTION

An unmanned ground vehicle can be a military robot used to augment soldiers' capabilities. This type of a robot is generally capable of operating outdoor and/or indoors and over a wide variety of terrain, functioning in place of humans. Unmanned robotics can be developed for both civilian and military use to perform dull, dangerous or the like activities.

One example of an unmanned ground vehicle known in the art is a teleoperated vehicle that is controlled by a human operator at a remote location via a communications link. All cognitive processes are provided by the operator based upon sensory feedback from either line-of-sight visual observation or remote sensory input such as video cameras. The unmanned vehicle can be controlled at a distance via a wireless connection while the user provides all control based upon observed performance of the vehicle. There is a wide variety of such teleoperated unmanned ground vehicles in use today. Predominantly these vehicles are used to replace humans in hazardous situations such as: rescue tasks in catastrophic situations (e.g., natural disasters such as earthquakes), military, combat tasks in urban zones, and emergency rescue missions, e.g. during terror attacks.

SUMMARY OF THE INVENTION

The presently disclosed subject matter, in its one aspect, provides an operation platform, comprising: a platform base; a movement mechanism connectable to said platform base and, when so connected, configured for displacing the platform base; at least one operation tool zone on said platform base configured for accommodating therewithin at least one operation tool; and at least one boom assembly having a first end fixable to said platform base, and a second free end, the boom being controllable for displacing said second free end towards at least said one operation tool zone, coupling the second free end to at least said one operation tool accommodated within the operation tool zone, and maneuvering said second free end with at least said one operation tool coupled thereto.

The above operation platform can constitute or be a part of an unmanned ground vehicle, for example, such vehicle that is configured for demolition and breaching in urban fighting zones, for performing emergency search and rescue tasks, for treating hazardous materials that are dangerous for people (e.g., lifting the material, and digging in order to bury the material in the ground).

The operation platform can be remotely controllable by an operator (e.g., a soldier or a rescue team operator), in order to reduce the risk for his life in hazardous locations (e.g., urban fighting zones, collapsed buildings).

The operation platform can have a plurality of operation tool zones each configured for accommodating therein at least one operation tool, or it can have one operation tool zone configured for accommodating therein a plurality of operation tools. In any case, the operation platform can be configured for operating the plurality of operation tools to perform therewith a corresponding plurality of operations (each operation tool can be designated for performing a specific operation) and, particularly, for automatically changing the operation tools between the operations (as part of a specific activity), all by using the boom assembly. The change of the operation tools can be performed on-site, namely without the need to take to an operation tool from another location. The operation platform can be configured for choosing and switching operation tools according to different needs during one activity performed by the operation platform.

The operations and/or the activities that can be performed by the operation tools are, for example, compound breaching, demolition of concrete walls, sawing and cutting steel beams, and the like. Each operation tool can be designated for performing a specific operation, and a plurality of operation tools can be designated for performing a specific activity.

The operation platform can be pre-programmed to perform a plurality of activities, each of which requires a specific sub-array of operation tools, each configured to perform a specific operation.

The operation tools can be stored on the operation platform itself (and/or on a tool-carrier connected thereto), Alternatively, the operation tools can be stored at an external facility and can be automatically selected and the operation platform can be configured for controlling the boom assembly to transfer therefrom to the operation tool zone(s) those operation tools that are needed for a specific activity to be performed.

At least one of the operation tools can be provided with a corresponding compartment positionable, e.g. automatically positionable, at least at said one operation tool zone on the platform base, either together with the operation tool or prior to the disposition of the operation tool therein.

Alternatively, the compartment can be integrally mounted to the platform base or formed therein at least at said one operation tool zone, and the compartment being configured for receiving therein its corresponding operation tool.

In any of the above cases, the compartment can be configured to fit in shape and size to its corresponding operation tool, so as to firmly secure the latter in place.

The boom assembly can comprise a connection mechanism or a coupler configured for interconnecting said second free end to a corresponding coupling member of at least said one operation tool or to a corresponding holding member of at least said one compartment.

The connection mechanism between the boom assembly's second free end and at least said one operation tool or at least said one compartment can be selected from the group consisting of: mechanical mechanism, magnetic mechanism, electrical mechanism, and any combination thereof.

The operation platform can further comprise at least one outrigger configured for taking at least two states: a first transporting state in which said at least one outrigger can be elevated so at to allow movement of said platform base, and a second operating state in which said at least one outrigger can stabilize said platform base, preventing movement thereof.

The operation platform can further comprise at least one controlling unit configured to control the functioning of the operation platform by performing at least one of the following: controlling the displacement of said platform base by operating said movement mechanism; selecting a sub-array of operation tools from an array of operation tools; accommodating the operation tools of said sub-array of operation tools to their corresponding operation tool zones; selecting at least said one operation tool from said sub-array of operation tools; coupling the boom assembly's second free end to at least said one selected operation tool so as to allow said maneuvering; maneuvering said second free end with at least said one operation tool mounted thereon; optionally, returning the operation tool back to the platform base and, again optionally, replacing it with another operation tool.

The controlling unit can further be configured for controlling the functioning of the operation platform by at least one of the following: defining a plurality of activities which the operation platform needs to perform and associating each of the activities with one or more operation tools (a sub-array of operation tools) selected from an array of operation tools; selecting a predetermined activity from said plurality of activities; and registering its corresponding operation tool when accommodated within its corresponding operation tool zone.

The controlling unit can be connected to an input unit which is adapted to receive instructions from an operator, for controlling the functioning of the operation platform. The communication between said input unit and said controlling unit can be wireless or wired. The controlling unit can further be configured for performing at least one of the following: identifying the location of the corresponding operation tool zone of the selected at least said one operation tool; displacing said boom assembly's second free end towards the corresponding operation tool zone of a selected operation tool; locking said second free end to the selected operation tool; taking out the selected operation tool from its corresponding operation tool zone; directing said second free end with the selected operation tool mounted thereon towards a predetermined operational direction; receiving feedback from at least one external sensor regarding said operation, electrically operating the operation tool by delivering electrical signals to the operation tool during operation; returning the operation tool to its corresponding operation tool zone; de-coupling the boom assembly's second free end from the operation tool; selecting another operation tool; displacing the boom assembly's second free end towards the corresponding operation tool zone of the another operation tool; coupling the another operation tool onto the second free end; and, locking the second free end to the another operation tool.

The operation tool can be selected from the group consisting of: hydraulic hammer, power crushing jaws, pinch cutter, steel cutting scissors, concrete crushers, power crushing jaws incorporated with scissors, grapples, clamps for lifting objects, steel shears, hydraulic cutting disc, digging bucket, bores driller, mine clearing tool, and any combination thereof.

The at least said one operation tool zone can be configured for receiving therein its corresponding operation tool/s so as to prevent their being visually exposed to the environment.

The platform base can have a side portion configured to incorporate at least said one operation tool zone in their horizontal position.

According to another aspect of the presently disclosed subject matter there is provided the an operation platform system, comprising: a platform base; a movement mechanism connectable to said platform base and, when so connected, configured for displacement of the platform base; an array of operation tools having at least one operation tool; at least one operation tool zone on said platform base configured for accommodating thereat at least said one operation tool; and at least one boom assembly having a first end fixable to said platform base, and a second free end, the boom assembly being controllable for displacing said second free end towards one of said operation tool zones, coupling the second free end to at least said one operation tool accommodated within the operation tool zone, and maneuvering said second free end with at least said one operation tool coupled thereto.

According to a still further aspect of the presently disclosed subject matter, there is provided a method for operating an operation platform, comprising:

providing an operation platform, comprising: a platform base; a movement mechanism connectable to said platform base and, when so connected, configured for displacement of the platform base; at least one operation tool zone on said platform base configured for accommodating thereat at least one operation tool; and at least one boom assembly having a first end fixable to said platform base, and a second free end;

displacing said second free end of said boom assembly towards at least said one operation tool zone;

coupling the second free end to at least said one operation tool accommodated within the operation tool zone; and, maneuvering said second free end with at least said one operation tool coupled thereto.

BRIEF DESCRIPTION OF THE DRAWINGS

In order to understand the invention and to see how it can be carried out in practice, non-limiting examples will now be described with reference to the accompanying drawings, in which.

DETAILED DESCRIPTION OF EMBODIMENTS

Figure 1A:
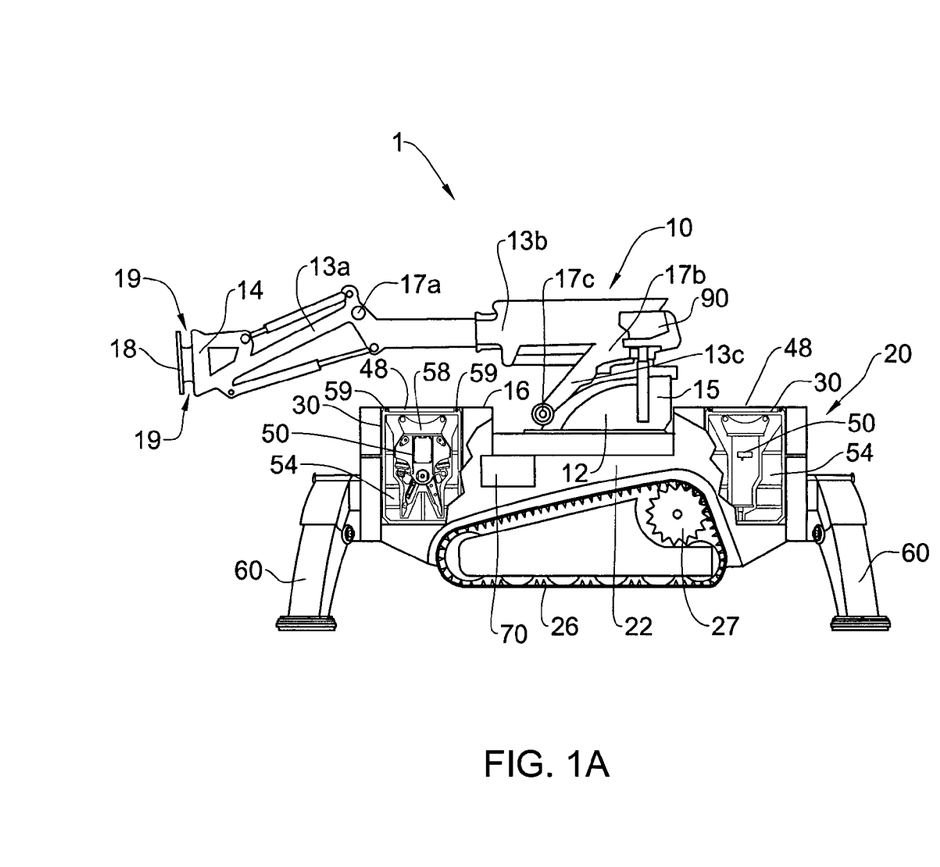
FIGS. 1A and 1B illustrate a side and a rear view, respectively, of an operation platform according to one example of the presently disclosed subject matter when the outriggers of the operation platform are in an operational state. The operation tool zones that are shown in these figures, are presented with an exploded view for purposes of illustration.
Figure 1B:
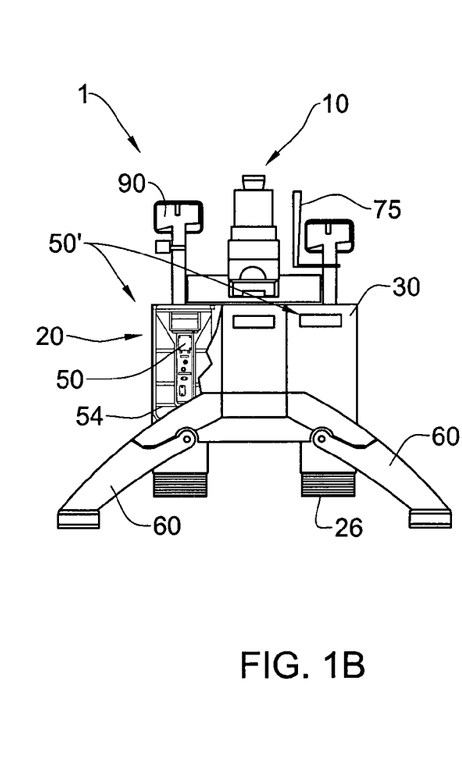

Attention is first directed to FIGS. 1A-B which illustrate one example of a side view and a rear view, respectively, of an operational platform 1, according to the presently disclosed subject matter. As generally shown in FIG. 1A, operational platform 1 comprises a platform base 20 having a platform base body 22. The platform base body 22 is connected to a movement mechanism 26 (e.g., undercarriage tracks, wheels) which is configured for displacement of the operation platform 1. The movement mechanism 26 can be driven by a power unit (e.g., an engine). The platform base body 22 has a plurality of operation tool zones 30 (e.g., cavities, openings, spaces, sockets, cages, carriers) with openings 48 which are located on an upper portion 16 of the platform base body 22. Each of the operation tool zones 30 is configured for accommodating therein an operation tool, generally indicated as 50. Each operation tool 50 can be designated for performing a specific operation, and a plurality of operation tools 50 can be designated for performing a specific activity. The operation tool zones 30 that are shown in FIGS. 1A-B, are presented with an exploded view for purposes of illustration.

The operational platform 1 additionally comprises a boom assembly 10 having three multiple arm segments 13a, 13b, and 13c. The arm segments 13a is pivotally connected to the arm segment 13b by a pivot 17a, and the arm segment 13b is pivotally connected to the arm segment 13c by a pivot 17b. The arm segment 13c of boom assembly 10 is also pivotally connected to a slewing upper structure 15 via pivot 17c. The upper structure 15 has a first end 12 being fixed to the upper portion 16 of the platform base body 22, and the arm segment 13a has a second free end 14 configured for being spatially maneuvered for various tasks which the operation platform 1 is intended to perform. The upper structure 15 is configured for turning on a slewing ring bearing which allows the boom assembly 10 to rotate horizontally in full circle (360°) with relation to the platform base body 22. The boom assembly 10 can have a hydraulic mechanism for manipulating the second free end 14 by moving of the arm segments 13a, 13b, and 13c with respect to each other. The boom assembly 10 can perform the manipulation of the second free end 14 in combination with the rotation of the upper structure 15, so as to allow the second free end 14 to be located in any spatial location in the 3-dimensional space within the limits of the dimensions of the boom assembly 10.

Each operation tool 50, can be provided with a corresponding compartment (e.g., a box, a container, section, storage structure), generally indicated as 54, each of which is mountable within one of the operation tool zones 30. According to the example of FIGS. 1A-B, each compartment 54 is configured for receiving therein its corresponding operation tool 50 in a vertical position. FIG. 1A illustrates a side view of the operation tools 50 with their corresponding compartments 54 accommodated within the operation tool zone 30, and FIG. 1B illustrates of rear view of the operation platform 1 with the operation tool 50 accommodated therein. The compartment 54 can be inserted into and pulled out of the operation tool zone 30 by the boom assembly 10 (or by any other means). Each compartment 54 can also be replaced with a different compartment 54 having a different operation tool therein (of the same or of a different type). According to other examples, the compartments 54 can be provided as an integral part of the operation tool zone 30, being fixed to their corresponding operation tool zones 30. In FIG. 1A illustrated two different compartments 54 (a compartment 54a shown in FIGS. 6A-C, and a compartment 54b shown in FIGS. 7A-C), each of which is configured to receive therein a different operation tool 50 (a pinch cutter 50a shown in FIGS. 6A-C, and a hydraulic hammer 50b shown in FIGS. 7A-C).

As it is clearly shown in FIGS. 1A-B, the operation tool zone 30 is configured for receiving therein its corresponding operation tool 50 so as to prevent visually exposed thereof to the environment. Namely, when accommodated within the operation tool zone 30, the operation tool 50 is hiddenly disposed therein, so that its type and its structure are now seen from the exterior of the operation platform 1. This can be important in a case in which the operator(s) of the operation structure would like to conceal the operation tools which are accommodated within the operation platform 1.

Figure 6A:
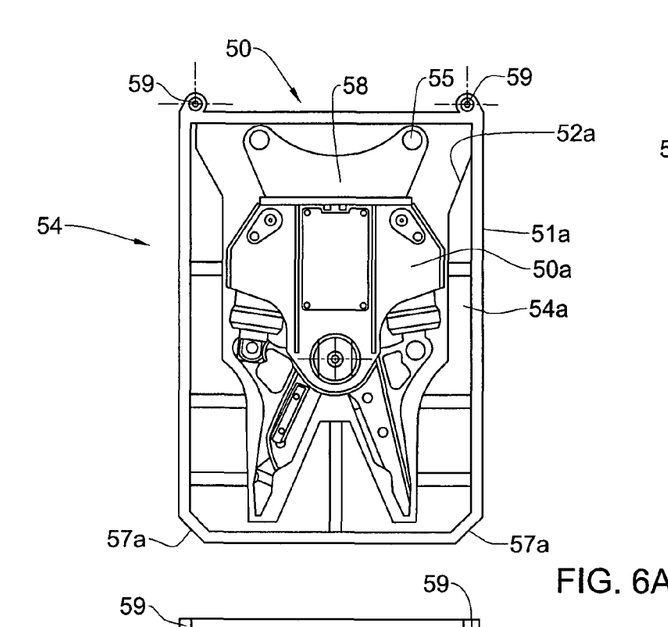
FIGS. 6A-C illustrate a front, a side, and an upper view, respectively, of a compartment according to one example of the presently disclosed subject matter.
Figure 6B:
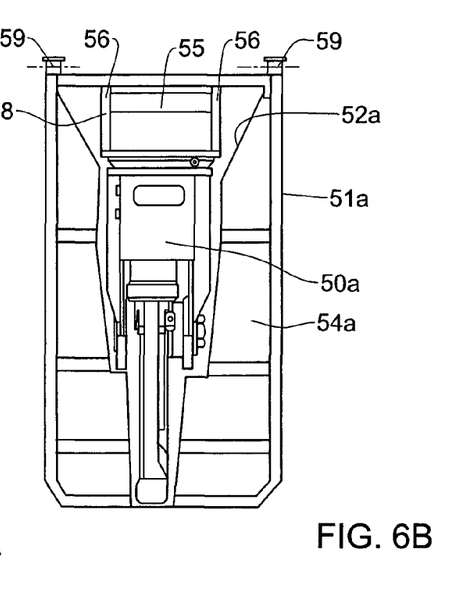
Figure 6C:
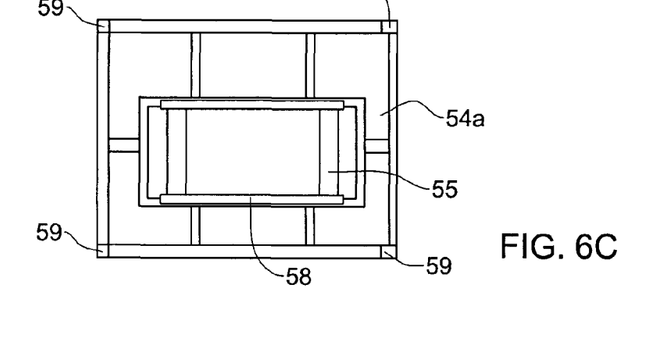

Attention is now made to FIGS. 6A-C, which illustrate a front, a side, and an upper view of a compartment 54a in a detailed manner, respectively. According to these figures, the compartment 54a has an outer wall 51a and an inner wall 52a. The outer wall 51a can have a shape and size which is configured to fit the shape and size of each one of the operation tool zones 30. The outer wall 51a can be favorably shaped in a way which allows its installment in a matching cavity within the operation tool zone 30 of the operation platform 1. For example, the outer wall 51a can have a box like shape outline which allows to slide it into a matching cavity in the operation platform, without any need to apply any access force beyond the compartment's self weight (with or without an operation tool inside). The compartment 54a has low corners 57a which contribute to the easiness of sliding the compartment inwards and outwards of a matching cavity of the operation tool zone 30 of the operation platform 1. The inner wall 52a of the compartment 54a can have a shape and a size which suit the shape and the size of an operation tool configured to be accommodated therein. According to FIGS. 6A-C, the operation tool which is accommodated within the compartment 54a is a pinch cutter 50a, and the inner wall 52a is shaped so as to incorporate and firmly secure the pinch cutter 50a therein. The pinch cutter 50a has a coupling member 58 which is constructed of two elongated elements 55 which are held by rigid structures 56. The two elongated elements 55 of the coupling member 58 is configured for being coupled to a coupler 18 which is connected to the second end 14 of the boom assembly 10. The coupling between the coupler 18 and the coupling member 58 is configured to be performed by insertion of the elongated elements 55 in their corresponding recesses 19 (shown in FIG. 1A). As clearly illustrated in FIGS. 6A-C, the compartment 54a has four holding members 59 which can be used for lifting and moving the compartment 54a for example during its accommodation within one of the operation tool zones 30 on the platform base 20.

Figure 7A:
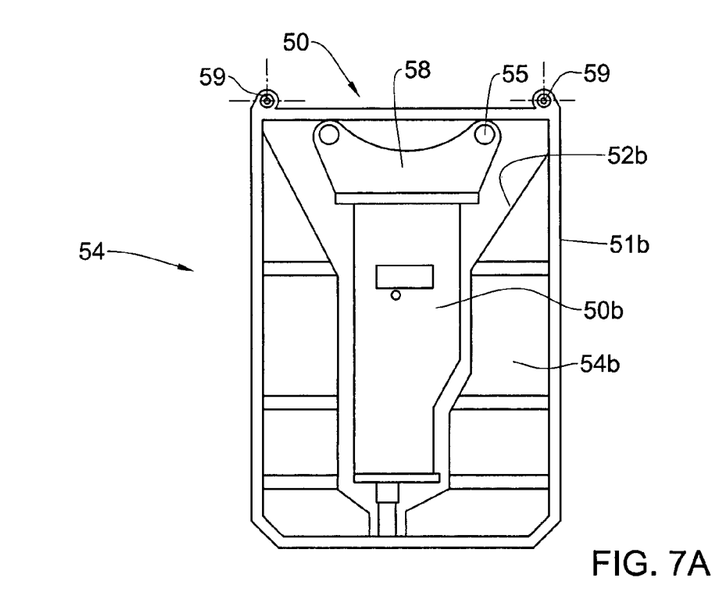
FIGS. 7A-C illustrate a front, a side, and an upper view, respectively, of a compartment according to another example of the presently disclosed subject matter.
Figure 7B:
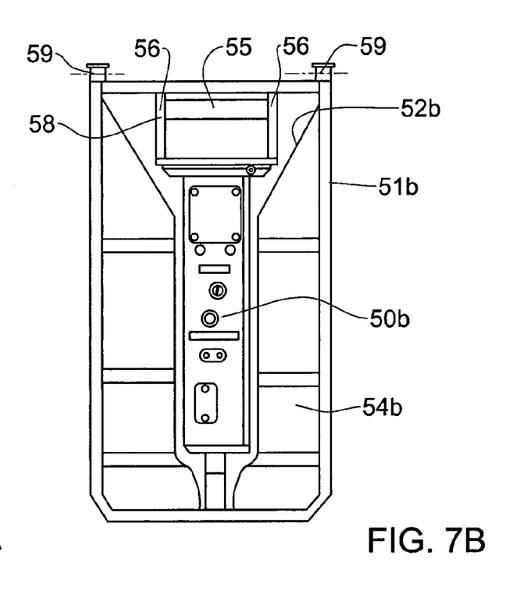
Figure 7C:
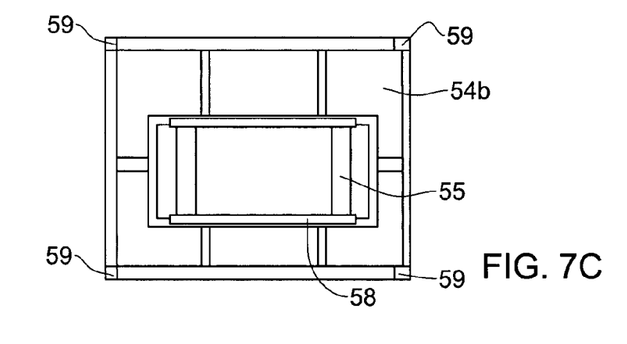

Attention is now made to FIGS. 7A-C which illustrates a front, a side, and an upper view of the compartment 54b in a detailed manner, respectively. The compartment 54b illustrated in these figures has an outer wall 51b which has substantially the same dimensions and structure as outer wall 51a, so as to fit the shape and size of each one of the operation tool zones 30. An inner wall 52b of compartment 54b can have a shape and a size which fix the shape and the size of the operation tool configured to be incorporated therein. According to this example, the operation tool which is accommodated within the compartment 54b is a hydraulic hammer 50b, and the inner wall 52b is shaped so as to incorporate and firmly secure the hydraulic hammer 50b therein. The hydraulic hammer 50b has a coupling member 58 which is constructed of two elongated elements 55 which are held by rigid structures 56. The two elongated elements 55 of the coupling member 58 is configured for being coupled to a coupler 18 which is connected to the second end 14 of the boom assembly 10. The coupling between the coupler 18 and the coupling member 58 is configured to be performed by insertion of the elongated elements 55 in their corresponding recesses 19 (shown in FIG. 1A). As can be clearly seen in FIGS. 6A-C and FIGS. 7A-C, the outer walls 51a and 51b have substantially identical shape and size, and the inner walls 52a and 52b are shaped differently due to the different structures of the pinch cutter 50a and the hydraulic hammer 50b which are configured to be received therein.

Referring back to FIGS. 1A-B, the operation tools 50 can be firmly coupled to the compartment 54, thereby substantially fixed in place with respect to the operation platform body 22. The operation tool 50 can be firmly coupled to the compartment 54 as long as such a fixed or constant position of the operation tool 50 therein is required. Therefore, forces exerted on the operation tool 50 while it is coupled to the compartment 50, such as forces resulting for example from a sudden acceleration or deceleration of the operation platform, would not affect the operation tool's position with respect to the operation platform body 22. According to certain examples, the firm holding (or gripping) of the operation tool 50 in place can be achieved by an electromechanical lock device which is unlocked when the operation tool 50 is detached from the compartment 54 via boom assembly 10. According to certain embodiments of the present invention, the operation tool 50 is constructed in such a way that its own weight forces it to be in the right fixed position, and only when it is pulled in a certain direction (e.g. by the arm of the boom assembly) it can be released from its corresponding compartment 54.

Figure 2A:
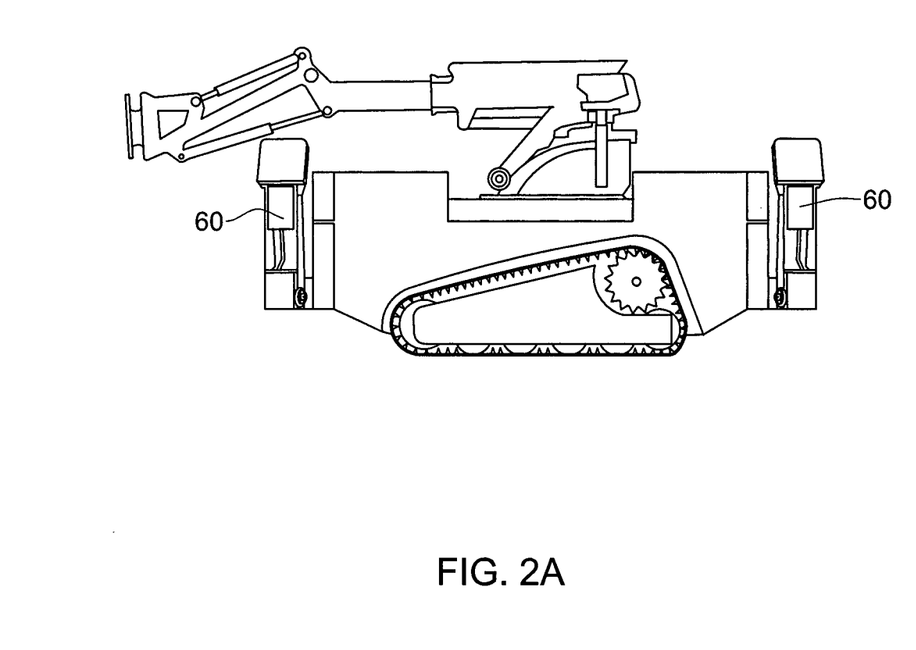
FIGS. 2A and 2B illustrate a side and a rear view, respectively, of an operation platform according to one example of the presently disclosed subject matter, when the outriggers of the operation platform are in a transporting state.
Figure 2B:
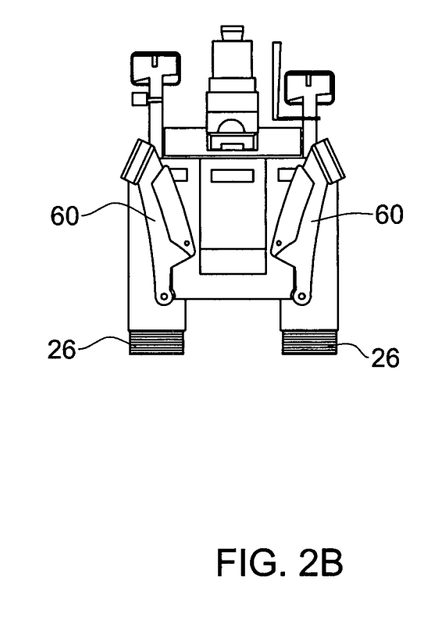

The operation platform 1 has four outriggers 60 (two frontal outriggers and two back outriggers) configured for taking two states: a first transporting state (as shown in FIGS. 2A-B and in FIG. 5A) in which the outriggers 60 are elevated so at to allow movement of the platform base 20 from place to place according to different needs, and a second operating state (shown in FIGS. 1A-B) in which the outriggers 60 are stabilizing the platform base 20 with respect to the ground and preventing its movement during operation.

As mentioned above, the second free end 14 has a coupler 18 which is configured for connecting the second free end 14 to a corresponding coupling member 58 of the operation tool 50. The coupler 18 can also be configured for connecting second free end 14 to the corresponding holding member 59 of the compartment 54. According to one example, the connection between the coupler 18 and the holding members 59 can be provided with an additional connector (not shown) configured for interconnecting therebetween. According to another example, the connection between the coupler 18 and the holding members 59 can be provided by changing the length of the coupler 18 and fitting it to the distance between at least two holding members 59.

The platform base 20 of FIGS. 1A and 1B is configured to receive and carry at the same time four different (or the same) operation tools 50, each accommodated within a corresponding compartment 54 which is configured to be received at its corresponding operation tool zone 30. These four operation tools 50 are defined for the purposes of the presently disclosed subject matter as a sub-array of operation tools 50'. The minimal number of operation tools 50 which can be incorporated in the sub-array of operation tools 50' can be one, and their maximal number equals to the number of the operation tool zones 30 on platform base 20. The sub-array of operation tools 50' can be selected from an array of operation tools 51 (for example, shown in FIG. 5B). The array of operation tools 51 can comprise any number of operation tools 50 which can be stored at an external location which can be, for example, a tool-carrier (shown in FIGS. 5A-B), a storage room, a warehouse, or any other conventional location in which operation tools can be stored. These operation tools can be stored with their corresponding compartments. The number of operation tools 50 in a sub-array of operation tools 50' is always less than (or equal to) the number of operating tools 50 of any array of operation tools 51 from which the sub-array 50' has been chosen. The operation platform 1 can be provided as a full operation platform system, when the operation platform 1 is provided with an array of operation tools 51 (with or without their corresponding compartments).

The operation tool 50 can also be any known in the art tool which can be mounted on and/or coupled to the second free end 14 of the boom assembly 10 in order to perform a specific operation. According to different examples, the operation tool 50 which can be included in the array of operation tools 51, can be at least any one of the following: hydraulic hammer, power crushing jaws, pinch cutter, steel cutting scissors, concrete crushers, power crushing jaws incorporated with scissors, grapples, clamps for lifting objects, steel shears, hydraulic cutting disc, digging bucket, bores driller, mine clearing tool. According to one of these examples, the hydraulic hammer can be used for an operation which is rock braking and concrete demolition, the digging bucket can be used for an operation which is loading and unloading loose material, the grapples can be used for an operation which is loading and shifting different objects, the steel shears can be used for an operation which is cutting steel bars and reinforced concrete, and the concrete crushers can be used for an operation which is demolition jobs.

The main operations which the operation platform 1 is configured to perform are the following: preparing itself for an activity by loading a plurality of operation tools 50 (the sub-array 50' of operation tools selected from an array of operation tools 51) thereon prior to an activity, displacing itself towards the location of the operation (e.g., a predetermined building, a predetermined object) by using movement mechanism 26, selecting and coupling to the second free end 14 of the boom assembly 10 one of the operation tools 50 located within one of the operation tool zones 30, and maneuvering the second free end 14 with the selected operation tool 50 mounted thereon in order to perform the operation which the selected operation tool 50 is designated to perform.

Figure 3A:
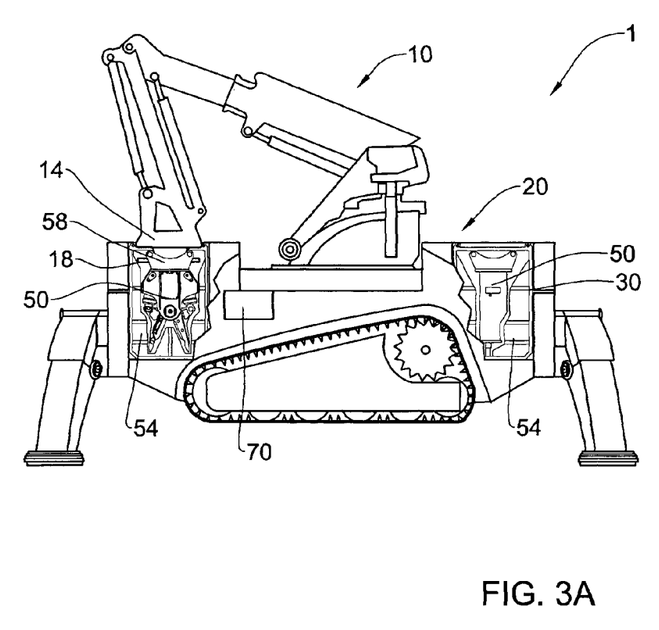
FIGS. 3A and 3B illustrate a side view of operation platform according to one example of the presently disclosed subject matter. These figures illustrate the process of selecting and coupling an operation tool. The operation tool zones that are shown in these figures, are presented with an exploded view for purposes of illustration.
Figure 3B:
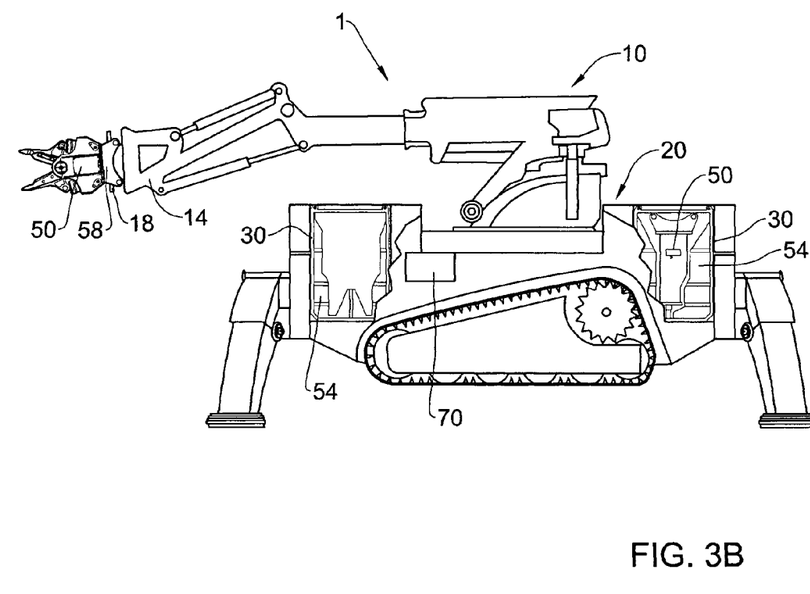

Attention is now made to FIGS. 3A-B, which illustrate the operation platform 1 in a pre-operation position. The operation tool zones 30 that are shown in FIGS. 3A-B, are presented with an exploded view for purposes of illustration. FIG. 3A illustrates the process of selecting an operation tool 50 (in this case the pinch cutter 50a from FIGS. 6A-C) located on the platform base 20 according to specific instructions received from a controlling unit 70 (e.g., according to instructions received from an operation) which is located within the operation platform 1. Following these instructions, the second free end 14 is displaced towards the corresponding operation tool zone 30 and compartment 54, the second free end 14 is inserted into the compartment 54 of the operation tool 50, and the coupler 18 is coupled to the coupling member 58 of the operational tool 50.

In FIG. 3B, illustrated second free end 14 with the operation tool 50 mounted thereon and ready for a specific operation which the operation 50 is designated to perform (which can be part of a general specific activity which the operation platform is intended to perform). Following the completion of this operation, the second free end 14 with the operation tool 50 mounted thereon can be displaced towards its corresponding compartment 54, and the coupler 18 can be automatically de-coupled from the coupling member 58 of the operation tool 50 after the position of the operation tool 50 within its corresponding compartment 54.

Each compartment 54 and/or operation tool 50 can include means for its identity verification such as RF tag or barcode tag that can be sensed by a corresponding sensor installed on the operation platform 1. This way, a mismatch between the identity of the compartment 54 and/or the operation tool 50, as configured in controlling unit 70 and the actual identity as revealed by the physical RF tag or barcode tag, can be immediately recognized and reported for example to an operator of the operation platform 1.

Figure 4:
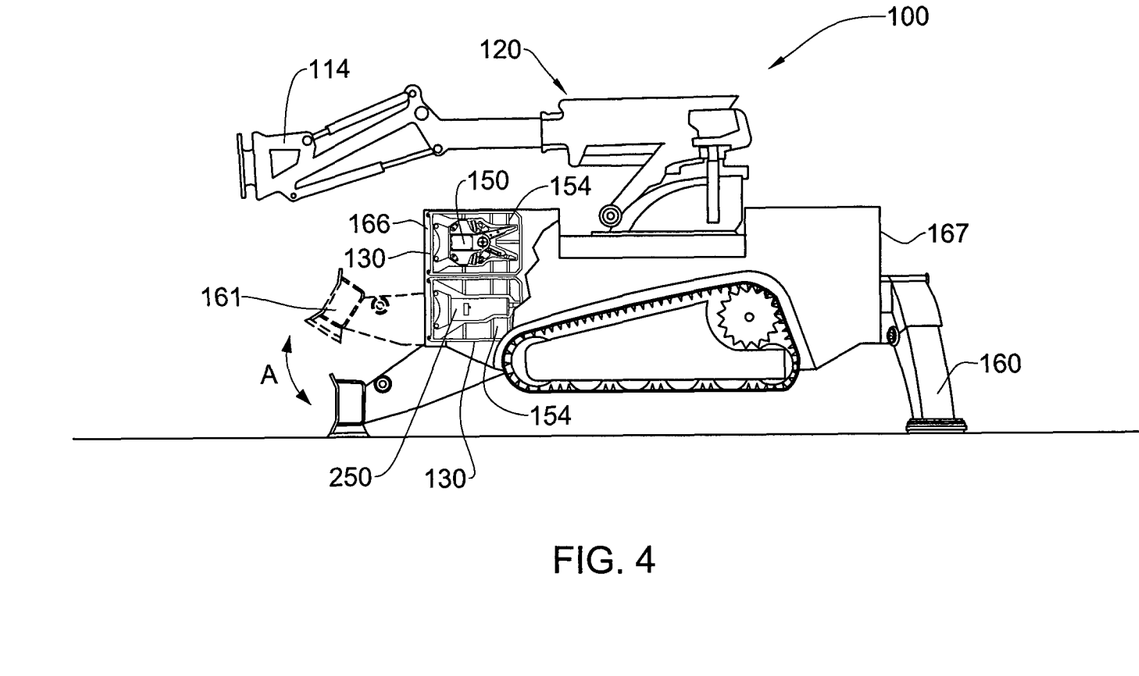
FIG. 4 illustrates a side view of an operation platform according to another example of the presently disclosed subject matter, in which the operation tools are horizontally positioned when accommodated within the operation platform. The operation tool zones that are shown in these figures, are presented with an exploded view for purposes of illustration.

In FIG. 4 illustrated another example of an operation platform 100. According to this example, the operation platform 100 has the same technical features as operation platform 1, and the difference between them is the position of the operation tools therein, and the structure of the front outriggers. The operation platform 100 has operation tool zones 130 which are configured to accommodate operation tools 150 with their corresponding compartments 154. The operation tool zones 130 which are shown in FIG. 4, are presented with an exploded view for purposes of illustration. As can be clearly seen in this figure, the operation tools 150 are horizontally positioned within their corresponding compartments 154. In order to connect the second free end 114 to one of the operation tools 150, the second free end 114 can be displaced toward a frontal portion 166 or a back portion 167 of the operation platform 100. The operation platform 100 is having one front bulldozer 161 which is used as an integrated stabilizer and two back outriggers 160. The bulldozer 161 is configured to move along the direction of arrow A in order to be in one of the states: a transporting state (marked with a dotted line) and an operating state (marked with a solid line). The back outriggers 160 are configured to move in the same manner of the outrigger 60 which are shown in FIGS. 1A-B.

Figure 5A:
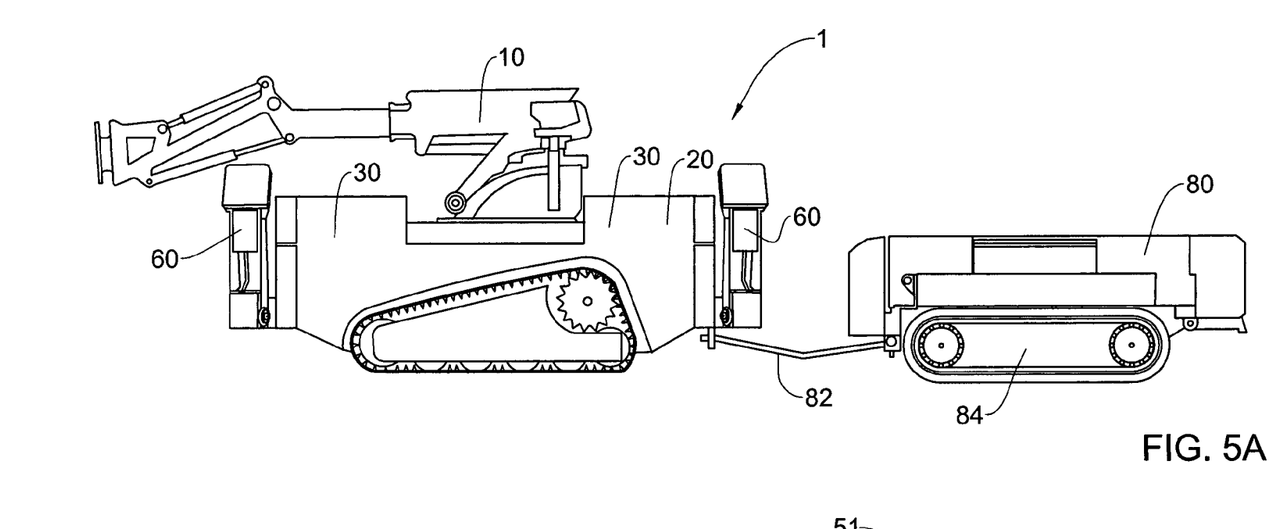
FIG. 5A illustrates a side view of one example of an operation platform with a tool-carrier platform connected thereto.
Figure 5B:
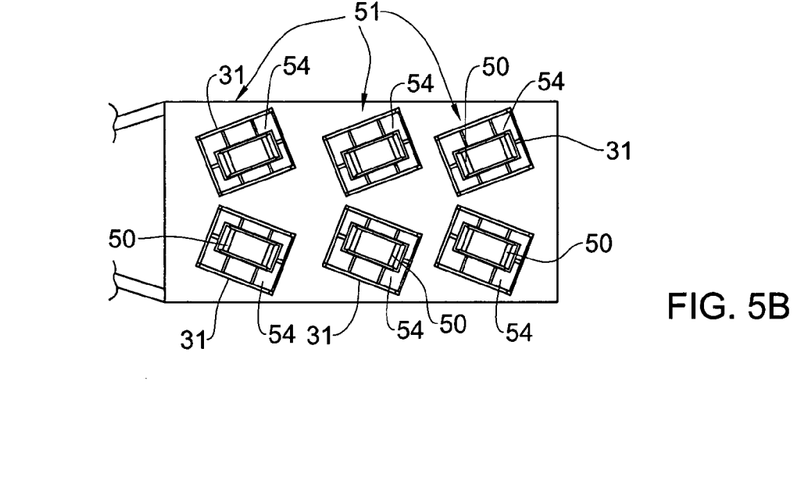
FIG. 5B illustrates an upper view of a tool-carrier platform, according to one example.

Reference is now made to FIGS. 5A-B, in which illustrated the operation platform 1 with a tool-carrier platform 80 connected thereto via a connecting mechanism 82. In FIG. 5A illustrated a side view of the operation platform 1 with the tool-carrier platform 80, and in FIG. 5B illustrated an upper view of the tool-carrier platform 80. The tool-carrier platform 80 illustrated in these figures is configured for accommodating the array of operation tools 51 and/or the sub-array of operation tools 50' in their corresponding operation tool zones 31. Each of the operation tools of assembly 51 can be stored in its corresponding compartment 51, and the compartment can be accommodated within the operation tool zones 31. The tool-carrier platform 80 can have a displacement mechanism 84 which is configured for allowing displacement thereof. As shown in FIG. 5A, the outriggers 60 of the operation platform 1, are in their transporting state (similar to FIGS. 2A-B). In this state, the operation platform 1 can be displaced from one location to another location with the tool-carrier platform 80 connected thereto. Prior to a specific pre-selected activity, the boom-assembly 10 can select specific compartments 54 with operation tools 50 located within operation tool zones 31, and displace the selected compartments to the corresponding operation tool zones 30 located on platform base 20. According to different examples, the tool-carrier platform 80 can be provided as an integral part the operation platform 1. In this case, the tool-carrier platform 80 can be used for accommodating the sub-array of operation tools 50' during an activity of the operation platform, and the boom assembly can use the operation tools 50 accommodate within the tool-carrier platform 80 for mounting one of them thereon, and using it during said activity.

In order to perform the different operations and/or activities, the operation platform 1 comprises the controlling unit 70 (mentioned above) configured to control the functioning of the operation platform 1. The controlling unit comprises a memory and a processor which can be programmed in order to perform different tasks. For example, the controlling unit 70 can control the displacement of the platform base 20 by operating the movement mechanism 26. This can be performed by instructing the movement mechanism 26 to rotate or to stop rotating wheel 27. The controlling unit 70 can be used in order to define a plurality of activities which the operation platform is able to perform (e.g., breaking a wall, treating explosives, moving objects from place to place, etc.) This can be performed by associating each of the activities with a predetermined sub-array of operation tools 50'. For example, in order to break a wall, the following two operation tools can be needed: a hydraulic cutting disc, and a hydraulic hammer, each of which is designated to perform a specific operation. These two operation tools assemble a sub-array of operation tools which are associated with the activity of breaking a wall. The definition of the activities can be performed by an operator which instructs the controlling unit 70 for this task. The controlling unit 70 can be programmed for selecting the sub-array of operation tools 50' from an array of operation tools 51 and accommodating the operation tools 50 of the sub-array of operation tools 50' at their corresponding operation tool zones 30. This can be performed in a serial manner (one by one) by detecting each one of the operation tools 50 in the sub-array 50', coupling the second free end 14 to the compartment 54 of each operation tool 50, and displacing the second free end 14 with the compartment 54 coupled thereto towards the corresponding operation tool zone 30. Each compartment can be received within an available operation tool zone 30 at each time, and registered therein by the controlling unit 70. By doing this, the controlling unit 70 can control the accommodation of the operation tools 50 on the platform base 20. According to an alternative example, the operation tools 50 can be transferred to the platform base without their compartments 54. In this case, the second free end 14 can be coupled to the coupling member 58 of each operation tool 50, and afterwards the operation tool 50 will be displaced to its corresponding operation tool zone 30. According to this example, the operation tool zones 30 already include the compartments 54.

Following the placement of the operation tools 50 on operation platform 1, the controlling unit 70 can use the operation tools 50 for predetermined activities. This can be performed by controlling the selection an operation tool 50 from the sub-array of operation tools 50' accommodated in platform base 20. The selection of the operation tool 50 can be accompanied with identification of the location of the operation tool zone 30 of the selected operation tool 50, displacement of the second free end 14 towards the corresponding operation tool zone 30 of the selected operation tool 50, coupling of the second free end 14 to the selected operation tool 50 by locking of second free end 14 to the operation tool 50 (for example, by using coupler 18 and coupling member 58), and taking out the operation tool 50 from its corresponding operation tool zone 30, i.e., from the compartment in which the operation tool 50 is accommodated. The operation tool 50 can be coupled and/or de-coupled to and from the second free end 14 in an automatic manner. All these operations can be controlled by the controller 70. Following the extraction of the operation tool 50 from its compartment (or its operation tool zone), the operation tool can be used for performing its designated operation. For this purpose, the controlling unit 70 can control the maneuvering of the second free end 14 with the selected operation tool 50 mounted thereon. During the maneuvering, the controlling unit 70 can also direct the second free end 14 with the operation tool 50 mounted thereon towards a predetermined operational direction (e.g., a wall that has to be broken by the operation tool), receive feedback from an external sensor (e.g., a camera 90, IR vision systems) regarding the operation, and, electrically operate the operation tool 50 by delivering electrical signals to the operation tool 50 during the operation (in a case in which the operation tool 50 is having an ability to perform electrically operated tasks such as cutting, rotating, moving, etc.). Additionally to all these tasks, the controlling unit 70 can also control the process of replacing the operation tool 50 coupled to second free end 14 with another operation tool. This can be performed by inserting the operation tool 50 coupled to the second free end 14 to its corresponding operation tool zone 30, de-coupling the second free end 14 from the operation tool 50, selecting another operation tool, displacing the second free end 14 towards the corresponding operation tool zone of the another operation tool, coupling the another operation tool onto the second free end 14, and locking the second free end tool-carrier platform 80 to the another operation tool. The controlling unit 70 is also configured for controlling the position of outriggers 60 by converting thereof from the first transporting state (FIGS. 1A-B) or the second operating state (FIGS. 2A-B).

The controlling unit 70 is connectable to an input unit (not shown) which is configured for receiving instructions from an operator, thereby controlling the functionality of the operation platform 1. The communication between the controlling unit 70 and the input unit can be provided by a wireless receiver 75 located on the upper portion of the platform base 20.

Figure 8:
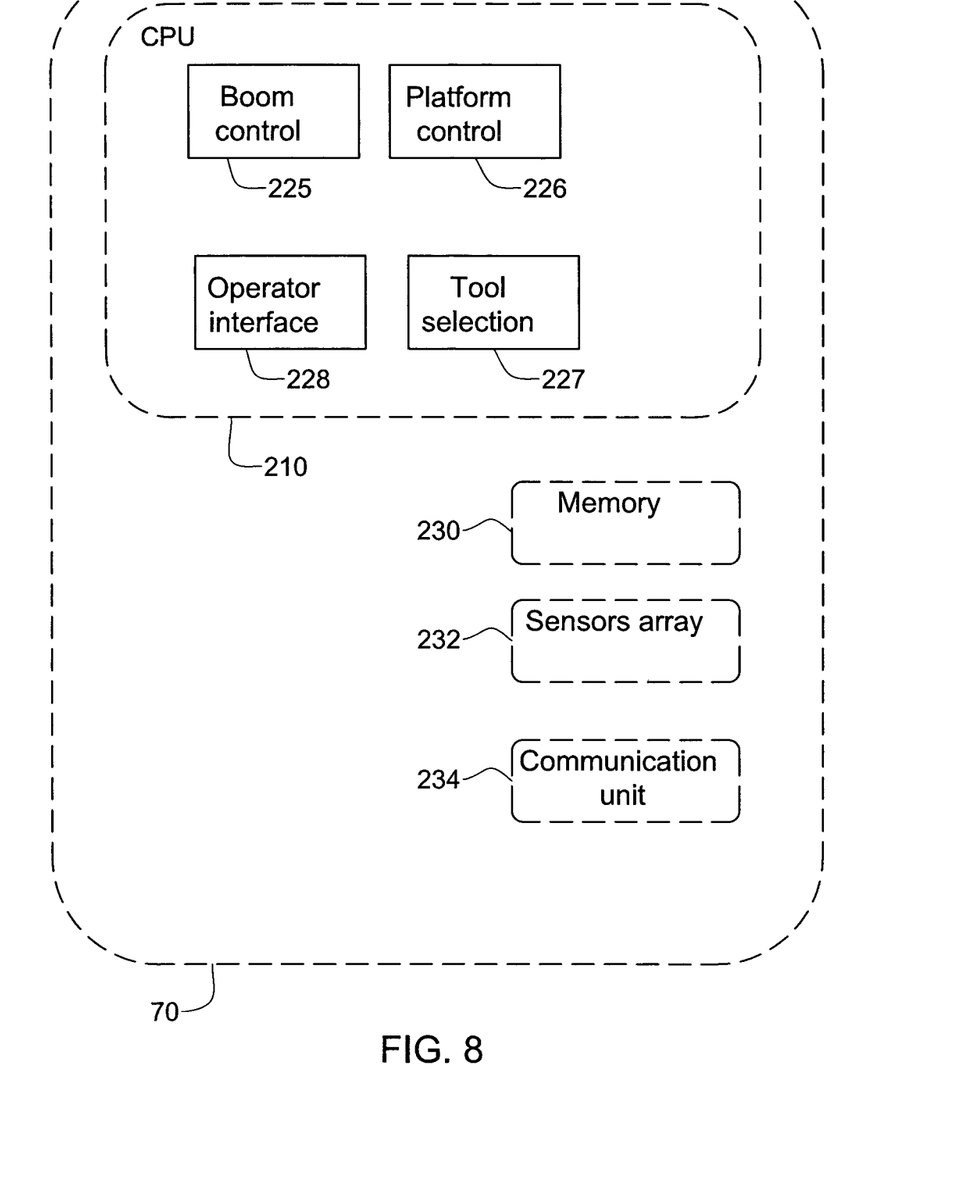
FIG. 8 schematically illustrates a structure of a controlling unit, according to one example of the presently disclosed subject matter.

Reference is now made to FIG. 8 in which illustrated an example of the controlling unit 70, and some of its internal modules. The controlling unit 70 can be responsible for the automatic process in which a specific operation tool 50 is automatically coupled to the boom assembly 10, and also for other operation which the controlling unit 70 can control. According to one example, during the automatic process in which a certain operation tool 50 is automatically coupled the boom assembly 10, there is no requirement for any active physical intervention from an operator of the operation platform 1. According to another example, the operator can fully control the operation of the operation tool mounted on the boom assembly in a manual or a semi-manual manner (e.g., via a joystick).

In FIG. 8 illustrated a schematic block diagram of the controlling unit 70 which comprises a CPU 210 configured for performing computerized functionalities which are performed by modules such as the following modules: a boom control module 225, a platform control module 226, a tool selection module 227, and an operator interface module 228. The boom control module 225 is configured to control the position of the boom assembly 10 in the three-dimensional space. This includes for example controlling the boom assembly's second free end 14 lift and tilt angles, and the turning of the upper structure 15. The platform control module 226 is configured to track the type and the location of each operation tool 50 with its corresponding compartment 54 which are located on platform base 20. The data of each compartment 54 can be stored for example on a memory unit 230 which is located within the controlling unit 70. According to different examples of the presently disclosed subject matter, the memory unit 230 can store the following data: identity number of each operation tool, identity number of each operation tool zone, identity number of each boom assembly, weight of each operation tool, identification number of a corresponding compartment of each operation tool, spatial location of the operation tool on the platform base, identification number of a corresponding operation tool zone of each operation tool, number of total activation hours of each operation tool, number of maximal activation hours of each operation tool, type of each operation tool, the activities which said operation tool is configured to perform, the operation which said operation tool is configured to perform, present location of each operation tool, present location of the second free end of each boom assembly, maximum carrying capacity of each boom assembly, occupancy of each boom assembly, occupancy of each operation tool zone, the current operation tool coupled to the boom assembly, the current location of each compartment.

Figure 9:
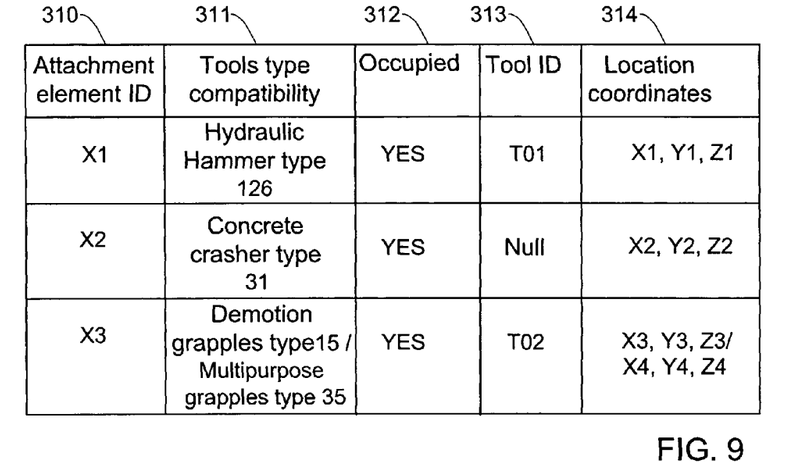
FIG. 9 schematically illustrates a table stored within of a controlling unit, according to one example of the presently disclosed subject matter.

This data can be organized in a table such as the table shown in FIG. 9. Referring to FIG. 9, the data of each compartment 54 can include for example the unique identity number (column 310) and the type of operation tool 311 (column 311) which can be stored within the compartment. This data can also include for example data related to whether any operation tool 50 is presently stored therein (column 312) and the operation tool's identification number (column 313). This data can also include the relative location of the compartment with respect to a certain fixed location on board of the operation platform 1 (column 314). This data can be specified for example by XYZ coordinates. The XYZ coordinates can specify for example a position which the boom assembly should be moved to in order to couple or de-couple compartment and/or the operation tool incorporated therein. The location of the compartment 54 (column 314) enables the controlling unit 70 to direct the second free end 14 accurately to the appropriate position for coupling or de-coupling of an operation tool from the specific compartment 54, or in order to displace the compartment into a specific operation tool zone 30.

Figure 10:
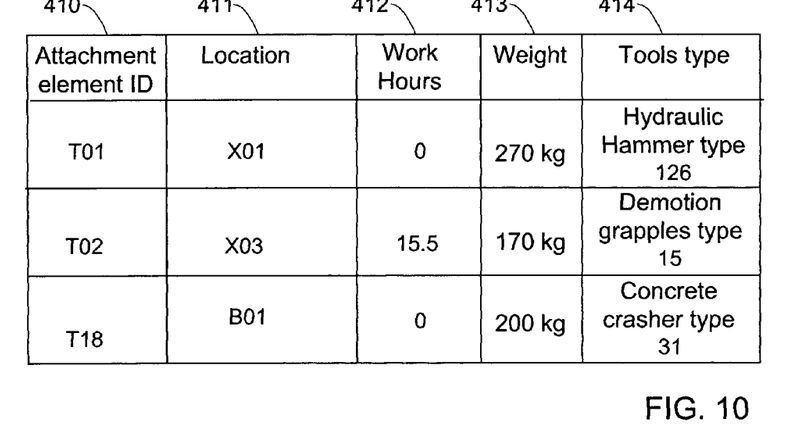
FIG. 10 schematically illustrates a table stored within of a controlling unit, according to another example of the presently disclosed subject matter.

The platform control module 226 can be configured to track all the available operation tools 50 which are on board of the operation platform 1 and each such tool's data. The data which is related to each operation tool 50 can be stored for example on the memory unit 230. This data can be organized in a table such as the table shown in FIG. 10. Referring to FIG. 10, the table in this figure includes for example each operation tool's unique identity number (column 410) and their location on board the operation platform 1 (column 411) (I.e. either the identity of the respective compartment in which they are incorporated or otherwise the identity of the boom assembly to which the operation tool is coupled to. The operation tool's data can additionally include for example the number of work hours the operation tool has been actively used since the last service (column 412). The operation tool's data can additionally include for example the weight of the operation tool (column 413) and its type (column 414).

Figure 11:
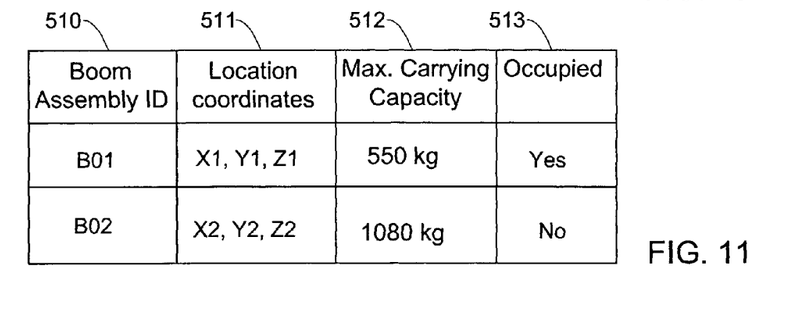
FIG. 11 schematically illustrates a table stored within of a controlling unit, according to another example of the presently disclosed subject matter; and, FIG. 12 schematically illustrates a process according to which an operation tool is selected, according to one example of the presently disclosed subject matter.

According to an example in which more than one boom assembly is included within an operation platform (not shown) the platform control module 226 can also be configured to track each boom assembly, and its related data. This data can also be stored for example on memory unit 230. The data can be organized in a table such as the table shown in FIG. 11. Referring to FIG. 11, the boom assembly's data includes for example each boom's assembly unique identity number (column 510) and the location of its second free end 14 with respect to a certain fixed location on board the operation platform (column 511). The data can be specified for example by XYZ coordinates. The boom assembly's data can additionally include for example the maximum carrying capacity (column 512) and whether it is occupied or not (column 513).

The controlling unit 70 can also comprise an operator interface module 230 which processes commands issued by an input unit of an operator and received by the communication unit 234 which can be connected, for example, to the wireless receiver 75.

The controlling unit 70 can also comprise a tool selection module 227. The tool selection module 227 is configured for responding to operation tool selection commands initiated for example remotely by an operator of the operation platform 1 and received at the operation platform by way for example of the wireless receiver 75 (e.g., RF receiver). The selection command can specify a type of an operation tool the operator would like to use. Once received, the selection command is processed by the tool selection module 227 as further illustrated with reference to FIG. 12, causing the controlling unit 70 to automatically couple the selected operation tool 50 to the boom assembly.

Figure 12:
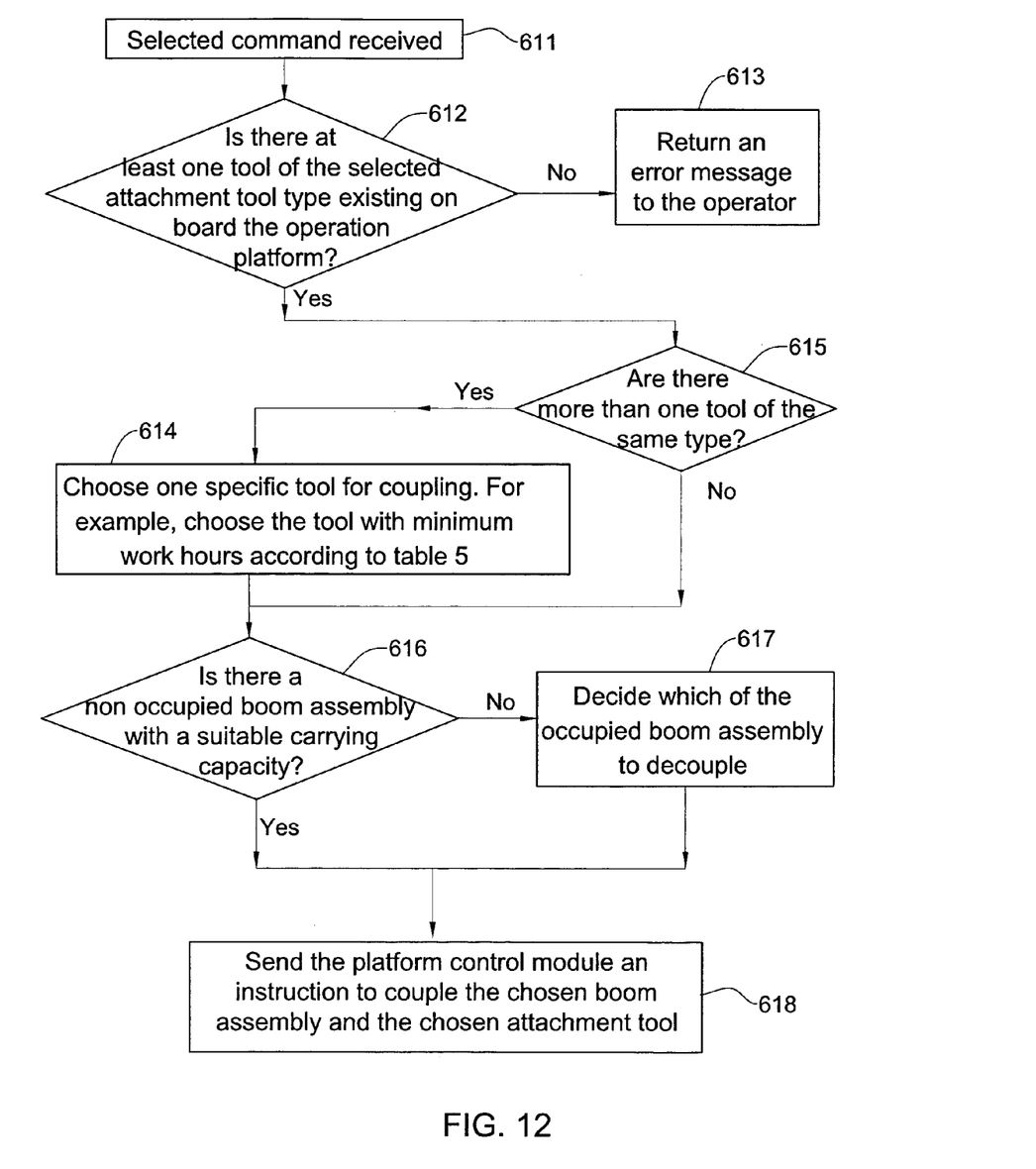

Reference is now made to FIG. 12 which schematically illustrates an example of a flowchart for the operation of controlling unit 70, detailing operations performed by the tool selection module 227 of FIG. 8 in response to a selection command initiated by an operator of the operation platform 1 which is received at the operation platform 1.

The process starts in with an event of a selection command received 811 at the operation platform 1 (e.g. by way of the wireless receiver 75) and processed by the operator interface module 228 of FIG. 8. The selection command specifying one of the operation tools 50 that the operator whishes to use. The command's content is transferred by the operator interface module 228 to the tool selection module 227 of FIG. 8 for further processing.

In operation 612 it is checked whether there is at least one operation tool on board the operation platform which corresponds to the tool type which was specified in the command. This can be checked, for example, by referring to the table of FIG. 10 which is stored in the memory unit 230 of FIG. 8. In case no such operation tool exists on board the platform, an error message is sent to the operator in step 613. Otherwise, it is checked at operation 615 whether there is more than one operation tool of the type specified by the operator. In case there are multiple operation tools of the same type. A specific operation tool is chosen for coupling at operation 614. For example, the chosen operation tool may be the one with minimum work hours according to the table at FIG. 10. In operation 616 it is checked whether there is a non occupied boom assembly with a carrying capacity suitable for carrying the selected operation tool. If no such boom assembly exists it is decide at operation 617 which of the occupied boom assembly to decouple. In operation 619, an instruction to couple the chosen boom assembly and the chosen operation tool is sent to the platform control module for execution. Returning to FIG. 8, the controlling unit 70 also can comprise an array of sensors 232 allowing it to sense the state of the operation platform 1 and collect information for example in relation to the data specified above with regard to FIGS. 9, 10, and 11. For example, pressure sensors confirm the successful detachment of an operation tool from one of the compartments and a successful coupling of the operation tool to the boom assembly.

The invention claimed is:

1. An operation platform, comprising:
   a platform base;
   a movement mechanism connectable to said platform base and, when so connected, configured for displacement of the platform base;
   at least two operation tool zones on said platform base, each of the at least two operation tool zones having a cavity receiving therein a compartment receiving an operation tool therein; and
   at least one boom assembly having a first end fixable to said platform base, and a second free end, the at least one boom assembly being controllable for,
      displacing said second free end towards one of said at least two operation tool zones;
      coupling the second free end to said operation tool accommodated within the one of said at least two operation tool zones; and
      maneuvering said second free end with said operation tool coupled thereto while the compartment for receiving the coupled operation tool remains within said cavity associated therewith;
   wherein in at least one of said at least two operation tool zones, said operation tool located in said compartment is accessible with said at least one boom assembly through an open upper end in said compartment and hidden when said operation platform is viewed from a lateral side thereof.

2. The operation platform according to claim 1, further comprising at least one controlling unit configured to control the functioning of the operation platform by performing at least one of the following:
   controlling the displacement of said platform base by operating said movement mechanism;
   selecting a sub-array of operation tools from an array of operation tools;

accommodating the operation tools of said sub-array of operation tools to corresponding ones of said at least two operation tool zones;

selecting said operation tool from said sub-array of operation tools;

coupling said second free end of said at least one boom assembly to said selected operation tool onto said second free end;

maneuvering said second free end with said operation tool mounted thereon; and replacing the operation tool coupled to said second free end with another operation tool.

3. The operation platform according to claim 2, wherein said controlling unit is further configured for controlling the functioning of the operation platform by at least one of the following: defining a plurality of activities which the operation platform needs to perform and associating each of said activities with a predetermined sub-array of operation tools; selecting a predetermined activity from said plurality of activities; or registering each operation tool when accommodated within a corresponding one of the at least two operation tool zones.

4. The operation platform according to claim 2, wherein said accommodating the operation tools of said sub-array of operation tools to a corresponding one of said at least two operation tool zones is performed by coupling said second free end to the compartment of each operation tool of said sub-array and displacing said second free end with the compartment coupled thereto towards the corresponding operation tool zone thereof.

5. The operation platform according to claim 2, wherein said selecting said operation tool from said sub-array of operation tools further comprises at least one of the following: identifying the location of the corresponding operation tool zone of the selected operation tool; displacing said second free end towards the corresponding operation tool zone of the selected operation tool; locking said second free end to the selected operation tool; or taking out that selected operation tool from its corresponding operation tool zone.

6. The operation platform according to claim 2, wherein said maneuvering said second free end with said operation tool mounted thereon further comprises at least one of the following: directing said second free end with said operation tool mounted thereon towards a predetermined operational direction; receiving feedback from at least one external sensor regarding said operation, or electrically operating the operation tool by delivering electrical signals to the operation tool during operation.

7. The operation platform according to claim 1, further comprising a tool-carrier connected to said platform base and configured for accommodating said operation tool within a corresponding one of the at least two operation tool zones.

8. The operation platform according to claim 1, wherein said operation tool zone is configured for receiving therein its corresponding operation tool so as to prevent visual exposure thereof to the environment.

9. The operation platform according to claim 4, wherein said controlling unit is having a memory unit adapted to store a plurality of characteristics associated with said operation tool, said at least one boom assembly and said operation tool zone, said plurality of characteristics is selected from the group consisting of: identity number of each operation tool, identity number of each operation tool zone, identity number of each boom assembly, weight of each operation tool, identification number of a corresponding compartment of each operation tool, spatial location of the operation tool on the platform base, identification number of a corresponding operation tool zone of each operation tool, number of total activation hours of each operation tool, number of maximal activation hours of each operation tool, type of each operation tool, the activities which said operation tool is configured to perform, the operation which said operation tool is configured to perform, present location of each operation tool, present location of the second free end of each boom assembly, maximum carrying capacity of each boom assembly, occupancy of each boom assembly, occupancy of each operation tool zone, the current operation tool coupled to the boom assembly, the current location of a compartment, and any combination thereof.

10. An operation platform system, comprising:
a platform base;
a movement mechanism connectable to said platform base and, when so connected, configured for displacement of the platform base;
a first compartment having a first outer surface and a first inner surface configured to fit a first operation tool in shape and size, when received therein;
a second compartment having a second outer surface being similar in shape and size to said first outer surface and a second inner surface being different in shape and size from said first inner surface and configured to fit a second operation tool in shape and size;
at least one operation tool zone on said platform base, having a cavity with shape and size which fit the shape and the size of the first outer surface and of the second outer surface, for allowing mounting therein one of said first compartment or said second compartment; and
at least one boom assembly having a first end fixable to said platform base, and a second free end, the at least one boom assembly being controllable for,
displacing said second free end towards said at least one operation tool zone;
coupling the second free end to said first operation tool or said second operation tool accommodated within said at least one operation tool zone; and
maneuvering said second free end with the operation tool coupled thereto while said first compartment and said second compartment remain mounted;
wherein when said operation tool is located in said first compartment or said second compartment, said operation tool is accessible with said at least one boom assembly through an open upper end in said first compartment or said second compartment and hidden when said operation platform is viewed from a lateral side thereof.

11. The operation platform system according to claim 10, further comprising at least one controlling unit configured to control the functioning of the operation platform by performing at least one of the following:
controlling the displacement of said platform base by operating said movement mechanism;
selecting a sub-array of operation tools from said array of operation tools;
accommodating the operation tools of said sub-array of operation tools to their corresponding operation tool zones;
selecting said operation tool from said sub-array of operation tools;
coupling said selected operation tool onto said second free end;
maneuvering said second free end with said operation tool mounted thereon;

maneuvering said second free end with said operation tool mounted thereon; and replacing the operation tool coupled to said second free end with another operation tool.

12. A method for operating an operation platform, the method comprising:

providing an operation platform, comprising: a platform base; a movement mechanism connectable to said platform base and, when so connected, configured for displacement of the platform base; at least two operation tool zones on said platform base, each of the at least two operation tool zones having a cavity configured for receiving therein a compartment configured for receiving an operation tool therein; and at least one boom assembly having a first end fixable to said platform base, and a second free end;

displacing said second free end of said at least one boom assembly towards one of said at least two operation tool zones;

coupling said second free end to said compartment of one of said at least two operation tool zones;

positioning said compartment coupled to said second free end through an open upper end of and into one of said cavities of said at least two operational zones;

coupling the second free end to said operation tool accommodated within said compartment in said one of said cavities of one of said at least two operation tool zones; and maneuvering said second free end with the operation tool coupled thereto while the compartment from which the coupled operation tool was taken remains within said cavity associated therewith.

13. The method according to claim 12, further comprising mounting the compartment within one of said operation tool zones.

14. The method according to claim 12, further comprising providing said operation platform with at least one controlling unit, and controlling the functioning of the operation platform by performing at least one of the following:

controlling the displacement of said platform base by operating said movement mechanism;

selecting a sub-array of operation tools from an array of operation tools;

accommodating the operation tools of said sub-array of operation tools to their corresponding operation tool zones;

selecting said operation tool from said sub-array of operation tools;

coupling said selected operation tool onto said second free end;

maneuvering said second free end with said operation tool mounted thereon; or replacing the operation tool coupled to said second free end with another operation tool.

15. The operation platform according to claim 1, wherein the cavities of said two operation tool zones are consistent in shape and size so as to fit the shape and the size of an outer surface of said compartment and allow said compartment to be accommodated within the cavities of each of said operation tool zones.

16. The operation platform according to claim 1, wherein the boom assembly is further controllable for displacing said second free end towards said compartment, coupling the second free end to the compartment, and maneuvering said second free end with the compartment coupled thereto.

17. The operation platform according to claim 10, wherein the boom assembly is further controllable for displacing said second free end towards said first compartment and said second compartment, coupling the second free end to one of the first compartment or the second compartment, and maneuvering said second free end with at least one of the first compartment and the second compartment coupled thereto.

* * * * *